United States Patent [19]
Dreher

[11] 3,839,281
[45] Oct. 1, 1974

[54] N-HYDROXYALKYLPIPERIDYL,N-HYDROXYALKYLPIPERAZYL COMPOUNDS AS ACCELERATING AGENTS IN EPOXY RESIN COMPOSITIONS

[75] Inventor: Bernd Dreher, Toms River, N.J.
[73] Assignee: Ciba-Geigy Corporation, Ardsley, N.Y.
[22] Filed: June 16, 1971
[21] Appl. No.: 153,857

[52] U.S. Cl... 260/47 EN, 117/93.4 R, 117/132 BE, 260/2 N, 260/2 EC, 260/2 EA, 260/28, 260/30.4 EP, 260/30.6 R, 260/31.8 E, 260/37 EP, 260/47 EA, 260/47 EC, 260/49, 260/59, 260/77.5 NC, 260/78.4 EP, 260/83.5, 260/83.7, 260/94.7 N, 260/830 TW, 260/831, 260/834
[51] Int. Cl............................................ C08g 30/14
[58] Field of Search........... 260/47 EN, 47 EC, 2 N, 260/2 EC, 59, 18 PF, 78, 4 EP, 77.5 NC

[56] References Cited
UNITED STATES PATENTS

| | | | |
|---|---|---|---|
| 3,530,093 | 9/1970 | Maurer | 260/47 |
| 3,655,617 | 4/1972 | Imoahl et al. | 260/47 |

OTHER PUBLICATIONS

Handbood of Epoxy Resin; Lee et al.; 1967; (pp. chapt. 9–1 to 9–4; 12–3).
Handbook of Epoxy Resins, Lee & Neville, (pp. 9–9 to 9–10); 1967.
Chem. Abst. Vol. 69, (p. 35960q), 1968.

*Primary Examiner*—William H. Short
*Assistant Examiner*—T Pertilla

[57] ABSTRACT

This invention relates to 1,2-epoxy resin compositions containing N-hydroxyalkyl substituted piperidyl or piperazyl compounds as novel accelerating agents. The composition can be suitably used in the preparation of cured epoxy resins which are used as coatings, adhesives, electrical insulators and the like.

3 Claims, No Drawings

N-HYDROXYALKYLPIPERIDYL,N-HYDROXYALKYLPIPERAZYL COMPOUNDS AS ACCELERATING AGENTS IN EPOXY RESIN COMPOSITIONS

BACKGROUND OF THE INVENTION

It has been an object in the art to manufacture cured epoxy resins in the presence of an accelerator so as to decrease the cure time and/or reduce the temperature of cure. These resin systems have found particular usefulness as coatings, adhesives and as electrical insulators. A variety of accelerators have been employed for this purpose such as phenols, aliphatic amines, pyridines, piperidine and the like. The use of accelerators, however, has usually either not met these objectives and/or in other cases the use of accelerators has had a detrimental effect on the properties of the resulting product. The use of accelerators in an epoxy resin system is of particular importance in the manufacture of sinter powders used as adhesives, particularly epoxy resin systems based on diglycidyl-polyether from a dihydric phenol and epichlorohydrin, and dicyandiamide or 2,6-xylylene biguanide as curing agents. Such formulated epoxy powder systems in unpigmented or pigmented form have been used for the coating of small metal parts as protection against corrosion, chemicals and solvents. The sinter powder has been applied in various application methods. Besides the fluidized bed method in which the general film thickness is over 100μ the electrostatic powder coating method has played the most important role. When this method is used the powder particles do not fall off even though the surface is cold, because of its electrostatic adhesion. After the powder application, the melting of the cold film results as a rule at 150°–300°C. In practice lower temperature and shorter cure time are demanded. An accelerator therefore has been needed. A system for using accelerators for such systems is described in patent No. 6817 548 NE. In this patent is described dicyandiamide formulated systems accelerated with monoaminopyridine, e.g. 4-aminopyridine. This system which has a higher reactivity and a shorter curing time shows, however, an unsatisfactory flexibility and adhesion and poor color stability. Therefore, there has been a need even in this field for sinter powder compositions which with an accelerator will increase the reactivity, while at the same time retain a satisfactory flexibility, good adhesion and retain color.

DETAIL DESCRIPTION OF THE INVENTION

It has now surprisingly been found that the abovementioned disadvantages can be avoided when one employs as accelerators in an epoxy resin system N-hydroxyalkylpiperidines or N-hydroxyalkylpiperazines and mixtures thereof. It has also been found that the use of these accelerators in an epoxy system lead to higher reactivity in shorter times and at the same time result in good flexibility and adhesion and retention of color when used particularly as adhesives.

Accordingly, this invention resides in a composition comprising an epoxy resin, a curing agent therefor and an accelerator selected from the class of N-hydroxyalkypiperidines and N-hydroxyalkylpiperazines. Another more particular aspect of this invention is directed to novel powdered compositions containing a solid 1,2-epoxy resin having more than one epoxy group, accelerator and curing agent which has been converted to a rapid curing powder coating by heating the composition to a hard mass which is then pulverised to the powdered composition.

Possible epoxide compounds useful in the invention are for example: alicyclic polyepoxides, such as vinylcyclohexene dioxide, limonene dioxide, dicyclopentadiene dioxide, ethylene glycol-bis(3,4-epoxytetrahydrodicyclopentadien-8-yl)ether, (3,4-epoxytetrahydrodicyclopentadien-8-yl)-glycidyl ether, epoxidised polybutadienes or copolymers of butadiene with ethylenically unsaturated compounds such as styrene or vinyl acetate; compounds having two epoxycyclohexyl residues such as diethylene glycol-bis-(3,4-epoxycyclohexane-carboxylate), bis-3,4-(epoxycyclohexylmethyl)-succinate, 3,4-epoxy-6-methylcyclohexylmethyl-3,4-epoxy-6-methyl-cyclohexanecarboxylate and 3,4-epoxyhexahydrobenzal-3,4-epoxycyclohexane-1,1-dimethanol.

Further possibilities are polyglycidyl esters such as are obtainable by reacting a dicarboxylic acid with epichlorhydrin or dichlorhydrin in the presence of alkali. Such polyesters can be derived from aliphatic dicarboxylic acids such as succinic acid or adipic acid, cycloaliphatic dicarboxylic acid such as hexahydro and tetrahydro phthalic acid also heterocyclic carboxylic acid (i.e. hydantoin) and especially from aromatic dicarboxylic acids such as phthalic acid or terephthalic acid. There may for example be quoted diglycidyl adipate and diglycidyl phthalate. Further, polyglycidyl compounds are those derived from the reaction of cyanuric acid and epichlorohydrin such as triglycidyl isocyanurate.

Further possibilities are basic polyepoxide compounds such as are obtained by reaction of primary or secondary aliphatic or aromatic diamines such as aniline, toluidine, 4'4'-diaminodiphenylmethane, 4'4'-di-(mono-methylamino)-diphenylmethane or 4,4'-diaminodiphenylsulphone with epichlorhydrin in the presence of alkali.

Polyglycidyl ethers such as are obtainable by the etherification of a dihydric or polyhydric alcohol or diphenol or polyphenol with epichlorhydrin or dichlorhydrin in the presence of suitable catalysts. These compounds may be derived from glycols such as ethylene glycol, diethylene glycol, triethylene glycol, 1,3-propylene glycol, 1,4-butanediol, 1,5-pentanediol, 1,6-hexanediol, 2,4,6-hexanetriol, glycerine and especially from diphenols or polyphenols such as resorcinol, pyrocatechol, hydroquinone, 1,4-dihydroxynaphthalene, bis(p-hydroxyphenyl)methane, bis(p-hydroxyphenyl)methylphenylmethane, bis(p-hydroxyphenyl)tolylmethane, 4,4'-dihydroxydiphenyl, bis(p-hydroxyphenyl)sulphone and especially bis(p-hydroxyphenyl)dimethylmethane.

There may especially be noted the polyglycidyl ethers of bis(p-hydroxyphenyl)dimethylmethane (Bisphenol A) which correspond to the average formula

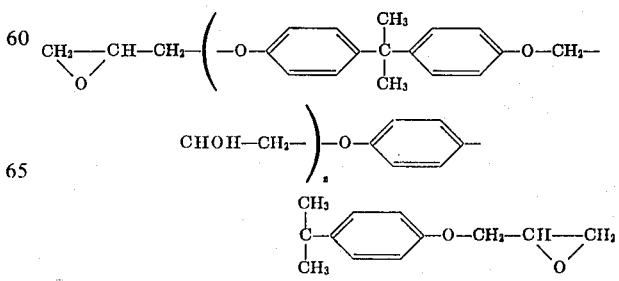

wherein z denotes an integral or fractional small number having a value of 0 to 2.

Furthermore mixtures of two or more of the above-mentioned epoxide resins may be used.

The compositions may suitably be comprised of a liquid or solid epoxy resin and preferably, when being employed as powder coatings, solid epoxy resins which melt above room temperature preferably above 75°C and especially above 85°C and have an epoxy equivalent of over 500, preferably between 500 and 2000 and especially 500–1000.

The epoxy resin component of these compositions can be conveniently prepared under conditions well known to the art. In the preferred aspect of the invention an epoxy resin is employed which contains more than one 1,2 epoxy group per molecule and is prepared for example by reaction of epihalohydrin or glycerol dihalohydrin at elevated temperatures with a dihydric phenol in the presence of an alkali hydroxide or other catalyst. The dihydric phenols are suitably those which contain at least 2 phenolic hydroxy groups and may contain any number of other substituents which are inert to epoxy groups. For example, the dihydric phenols may be represented by the following formulae:

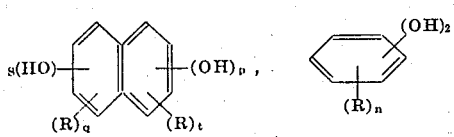

or

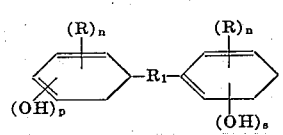

wherein R may be hydrogen, lower alkyl (of from 1–7 carbon atoms, such as methyl, propyl, t-butyl), halogen (bromo, chloro), aryl (such as phenyl and naphthyl), lower alk-aryl (wherein aryl moiety may be, for example, phenyl or naphthyl and alk from 1–7 carbon atoms; such as methyl, propyl and the like), ar-lower alkyl (such as phenyl and naphthyl lower alkyl wherein alkyl is from 1–7 carbon atoms, such as methyl, propyl, t-butyl and the like), cycloalkyl (i.e., cyclopentyl, cyclohexyl), cycloalkyl-alkyl (such as cyclopentyl, or cyclohexyl alkyl of 1–7 carbon atoms, such as methyl, propyl, t-butyl and the like), alkoxy (of from 1–20 carbon atoms, preferably from 1–7 such as methoxy, propoxy, 2-methoxyoctyl and the like), alkenyl (of from 2–20 carbon atoms, preferably from 2–7 carbon atoms, such as propen-1-yl, buten-2-yl and the like), and phenoxy; $R_1$ may be a bond between the two phenyl rings (i.e. to form a diphenyl moiety) or oxygen, sulfur, nitrogen, $-SO_2-$, a lower alkylene of from 1–10 carbon atoms (such as hexylene, methylene and the like), including both straight and branch-chain hydrocarbons, phenylmethylene or tolymethylene and n, q and t may be integers of from 1–3; when one of q or t is 3 the other is less than 2; p and s being an integer of from 0–2 and the sum of p and s being at least 2. In the preferred aspect of this invention, the dihydric phenols are those wherein $R_1$ is methylene or isopropylene, R is hydrogen, bromine or lower alkyl, p and s are each 1 and n, q and t are each integers of from 0–2. Specific suitable dihydric phenols which may be mentioned are p,p'-dihydroxydiphenyl propane (bisphenol A), resorcinol, 1,4-dihydroxynaphthalene, p,p'-dihydroxydiphenyl methane, 4,4'-dihydroxydiphenyl sulfone, tetrabromo- and tetrachloro-bisphenol A, pyrocatechol, hydroquinone, bis(4-hydroxyphenyl)-methyl-phenyl-methane, bis-(4-hydroxyphenyl)-tolyl-methane, 4,4'-dihydroxydiphenyl and phenolphthaline. The desired molecular weight for the epoxy resin component can be obtained by merely adjusting the ratio of epihalohydrin to dihydric phenol in a known manner.

The accelerating agents which can be employed in this invention are N-hydroxyalkylpiperidyl or N-hydroxyalkylpiperazyl compounds, containing one or two heterocyclic moieties, which may be substituted or unsubstituted, and mixtures thereof, but preferably the N-hydroxyalkylpiperidyl compounds. These compounds may contain at least 1 and at most 4 substituents on the carbon atoms of the ring. The only critical feature of these accelerating agents is that they be of the class described above; namely, piperidine or piperazine compounds containing a hydroxyalkyl substituent on the nitrogen atom. Accordingly, one may employ any suitable substituent on the ring carbon atoms. The accelerating agents may preferably be represented by the following structural formula:

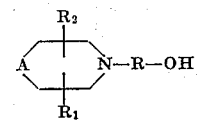

wherein A is $-CH_2-$, or $-NR_5-$ wherein $R_5$ is hydrogen, lower alkyl or hydroxy lower alkyl, R is a lower alkylene of from 1 to 6 carbon atoms, preferably from 1 – 3 carbon atoms, and the hydroxy group of which may be attached to any of the carbon atoms, but preferably to the end carbon atom; $R_1$ may be hydrogen or alkyl (of from 1 – 20 carbon atoms, preferably lower alkyl of from 1 – 7 such as methyl, propyl, pentyl and the like), phenyl, hydroxy, halo (such as chloro and bromo), halophenyl (such as p-chlorophenyl, o-bromophenyl and the like), hydroxyalkyl (of from 1 – 20 carbon atoms, preferably hydroxy lower alkyl of from 1 – 7 carbon atoms, such as hydroxymethyl, hydroxypropyl, hydroxybutyl and the like), or alkenyl (of from 2 – 20 carbon atoms, preferably lower alkenyl of from 2 –7 carbon atoms, such as pro-1-enyl, buty-2 -enyl and the like); $R_2$ may be hydrogen or a group of the formula

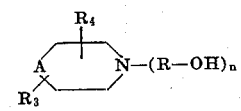

wherein $R_3$ is a direct bond or lower alkylene of from 1 to 6 carbon atoms, preferably 1 – 3 carbon atoms, and preferably attached at the para-position of each of the piperidyl moieties or meta position of the piperazyl moieties; R and $R_4$ are the same as R and $R_1$ above respectively, and $n$ is 0 or 1.

In the more preferred accelerating agents of this invention, R is lower alkylene of 1–3 carbon atoms, the hydroxy group of which is attached to the end carbon atoms. $R_1$ is hydrogen or hydroxyalkyl and attached to the ortho- or meta position relative to the nitrogen; $R_2$ is hydrogen or the group of the formula as mentioned above wherein $R_3$ is a direct bond or lower alkylene of from 1–3 carbon atoms and attached to the para position of each of the piperidyl moieties, a meta position of the piperazyl moieties, A is —$CH_2$— or —$NR_5$—, but especially a —$CH_2$— group, and $R_4$ is hydrogen. The most preferred accelerating agents may be represented as follows:

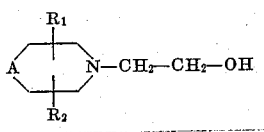

wherein $R_1$ is hydrogen, amino, bromophenyl, phenyl, hydroxy, hydroxyloweralkyl, lower alkyl or lower alkenyl; A is a —$CH_2$— group; and $R_2$ is hydrogen or when $R_1$ is hydrogen, $R_2$ is

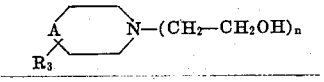

wherein $R_3$ is a direct bond or lower alkylene and $n$ is 0 or 1.

Representative accelerators are:

N-hydroxyethylpiperidine, N-hydroxypropylpiperidine, N-hydroxyisopropylpiperidine, 2-methyl-N-hydroxymethylpiperidine, 2-phenyl-N-hydroxymethylpiperidine, 2-hydroxy-N-hydroxymethylpiperidine, 2-chloro-N-hydroxymethylpiperidine, 2-p-chlorophenyl-N-hydroxymethylpiperidine, 2-hydroxymethyl-N-hydroxymethylpiperidine, 2-alkyl-N-hydroxymethylpiperidine, 1,3-di (N-beta hydroxyethyl)-4-piperidyl propane and 1-N-beta hydroxy-4-piperidyl-3-(4-piperidyl) propane.

Any one of several different catalysts or curing agents normally used for epoxy resins may be used in accordance with this invention for effecting the cross linking or thermosetting of the epoxy resin, including both liquid and solid curing agents. Suitable solid catalysts which may be used include, for example, metaphenylene diamine; dicyandiamide; 2,6-xylene biguanide boron trifluoride-monoethylamine complex; triethanolamine borate; methyl dianiline; pyromellitic dianhydride; hexachloroendomethylenetetrahydrophthalic anhydride; diamino diphenyl sulfone; phthalic anhydride; hexahydrophthalic anhydride; maleic anhydride; aminealdehyde condensation products, such as urea-formaldehyde, melamine-formaldehyde, etc; phenolaldehyde condensation products, such as formaldehyde, acetaldehyde, para-formaldehyde butyraldehyde and the like reacted with phenol, cresol, cresylic acid, etc. In the preferred aspect of this invention, dicyandiamide or 2,6-xylene biguanide is employed. These solid catalytic materials may be used singly or in combinations of any two or more.

The compositions of this invention may contain from about 0.8 to about 1.1 equivalents of curing agents per equivalent of epoxy and preferably from 0.95 to 1.05 equivalents. The accelerator may suitably be employed in a ratio of from about 1–40 parts per hundred parts of curing agent, preferably from 10–30 parts and especially from 12–20 parts.

The curable mixtures of the invention may furthermore contain suitable plasticisers such as dibutyl phthalate, dioctyl phthalate or tricresyl phosphate, inert organic solvents or diluent or so-called active diluents such as especially mono-epoxides, for example, butylglycid or cresylglycid.

Furthermore, the curable mixtures of the invention may before cure be mixed, at any stage, with extenders for epoxy resins such as asphalt, coal tar, bitumen or other usual additives such as fillers, pigments, dyestuffs, flame-retardant substances, mould release agents and the like.

In the manufacture of the ready-to-use sinter powders, fillers or reinforcing agents and/or pigments and/or materials which confer thixotropy, may additionally be incorporated into the resin and curing agent components. Suitable fillers for sinter powders are finely powdered substances such as titanium dioxide (rutile) or $SiO_2$ powder. A suitable additive for conferring thixotrophy is for example the finely divided silicon dioxide of large internal surface commercially available under the registered tradename "AEROSIL," or "CABOSIL."

In preparing the coating composition of the present invention, it is preferred to form initially a melt of the resin and subsequently add the curing agent and accelerator followed by grinding in a ball mill at room temperature. The total mixture is then introduced onto a two-roll hot roll mill maintained at a temperature of between 110° and 150°C. A A two-roll mill is not necessary to the process. Thus, any device or means of heating and mixing the ingredients in the molten state may be used.

After the resin is molten, any pigments or fillers desired are introduced into the resin, and grinding and milling is subsequently carried out.

After the resin melt has been uniformly milled, it is removed from the hot rolls and cooled. The resultant lumps of resin mixture then are broken and ground in a suitable grinding device such as a hammer mill, Wiley mill or other suitable grinding device to form a mass of powders. The particular size of the powdered composition may range between 20 and 350$\mu$ and preferably not over 70, when being employed as a spray powder, and between 50 and 250$\mu$ when employed in the fluidized bed method.

The following examples are given by way of illustration:

EXAMPLES

EXAMPLE 1

100 pbw of a solid polyphenol polyglycidyl ether based on bisphenol-A diglycidyl ether with an epoxy value/kg. 1.3 and a melting point of 96°C is mixed when melted with 1.3 pbw of a surface active agent (Modaflow, Monsanto polyacrylic ester) 3.9 pbw dicy (dicyandiamide) and 1.132 pbw 1,4-bis-(2-hydroxyethyl)-piperidine and ground in a ball mill at room temperature.

The total mixture is homogenized by an extruder or a two-roll mill at 120°C and, thereafter, cooled, ground and sieved (<70μ). The technical data for the above powder is:

| | |
|---|---|
| Pick-up time at 171°C | 158 sec. |
| Color (ASTM-D2244-64T, "b" yellowness | 21.1 |
| Shelf life at 40°C | >3 months |

The powder is applied to a clear steel panel with electrostatic spray equipment at a film thickness of 1.5–2.5 mils. After curing the film 5 minutes at 450°F, a coating results with the following properties:

Good adhesion

High flexibility (impact resistance, direct/reverse, 160/110 in./lb.)

Erichsen test DIN 53156>9.0 mm

Surface hardness pencil of 4H

| Resistance against | ethanol 95% | = 30 days |
|---|---|---|
| | MIBK | = 15 minutes |
| | Xylene | = >60 days |
| | HCl 20% | = 7 days |
| | $H_2SO_4$ 30% | = 20 days |
| | $NH_4OH$ 29% | = 30 days |

The coating is transparent and displays a high gloss.

Similarly, when an epoxy resorcinol ether (0.1:1 parts of resorcinol and epichlorohydrin), epoxy phenol novolac (1:1 parts of phenolformaldehyde and epichlorohydrin), epoxy cresol novolac (1:1 parts of cresolformaldehyde and epichlorohydrin), 20 parts/80 parts of pentaerythritol and bisphenol A, 20 parts/80 parts pentacryidylether and bisphenol A, cycloaliphatic resin (3-,4-epoxy-6-methyl-cyclohexylmethyl-3,4 epoxy-6-methylcyclohexane carboxylate and dimethylpropionic acid or adipic acid 80/20 parts), or heterocyclic resin, (hydantoin and epichlorohydrin 1:2 parts), is used in place of the resin in the above example, similar results are obtained.

EXAMPLE 1A

Similarly, when 100 g. of a solid polyphenol polyglycidyl ether based on bisphenol-A, diglycidyl ether with an epoxy value of 1/kg, and a melting point of 100°C, 1.3 pbw of a surface active agent (Modaflow Monsanto), 0.873 pbw of 1,4-bis-(2-hydroxyethyl) piperidine and 3.0 pbw of dicyandiamide are used in the above example, similar results are obtained.

EXAMPLE 2

101.3 pbw of the solid epoxy resin mixture as described in Example 1 are ground with 5.2 pbw 2,6-xylylene biguanide and 1.76 pbw 1,4-bis-(2-hydroxyethyl) piperidine in a ball mill, and the process described above in Example 1 is further applied. The powder displays a pick-up time of 210 seconds and a color value of 19. After curing the film 5 minutes at 400°F or 15 minutes at 350°F, a coating results with the following properties:

Excellent adhesion
Highest flexibility (impact resistance >160 in./lb.)
Erichsen test >9.0 mm
Surface hardness pencil of 5–6H

| Resistance against | ethanol 95% | = 16 days |
|---|---|---|
| | MIBK | = 15 minutes |
| | xylene | = >60 days |
| | HCl 20% | = 5 days |
| | $NH_4OH$ 29% | = 30 days |

The coating is transparent and displays a high gloss.

Similarly, when 101.3 pbw of the resin in Example 1A, 1.35 pbw of 1,4-bis-(2-hydroxyethyl)-piperidine and 4.0 pbw of 2,6-xylylene biguanide are used in the above example, similar results are obtained.

EXAMPLE 3

101.3 pbw of the solid epoxy resin mixture as described in Example 1 are ground with 3.9 pbw dicy and 2.428 pbw N-hydroxyethyl-4-propanolpiperidine in a ball mill, and the process described in Example 1 is further applied. The powder displays a pick-up time of 64 seconds and a color value of 21.3. After curing the film 5 minutes at 450°F, a coating results with the following properties:

Good adhesion
Good flexibility
Erichsen test 7.0 mm
Surface hardness pencil of 4H

| Resistance against | ethanol 95% | = 60 days |
|---|---|---|
| | MIBK | = 15 minutes |
| | xylene | = >60 days |
| | HCl 20% | = 30 days |
| | $NH_4OH$ 29% | = >60 days |

The coating is transparent and displays a high gloss.

EXAMPLE 4

101.3 pbw of the solid epoxy resin mixture as described in Example 1 are ground with 5.2 pbw 2,6-xylylene biguanide and 1.62 pbw N-hydroxyethyl-4-propanolpiperidine in the ball mill, and the process described in Example 1 is further applied. The powder displays a pick-up time of 200.6 seconds and a color value of 20.2. After curing the film 2 minutes at 450°F, a coating results with the following properties:

Excellent adhesion

Good flexibility (impact resistance, direct/reverse, 160/140 in./lb.) 5 minutes at 400°F and 15 minutes at 350°F impact resistance >160 in./lb.

Erichsen test 7–8 mm

Surface hardness pencil of 5–6H

| Resistance against | ethanol 95% | = 21 days |
|---|---|---|
| | MIBK | = 1–5 hours |
| | xylene | = >60 days |
| | HCL 20% | = 5 days |
| | $NH_4OH$ 29% | = 30–60 days |

The coating is transparent and displays a high gloss.

EXAMPLE 5

101.3 pbw of the solid epoxy resin mixture as described in Example 1 are ground with 3.9 pbw dicy and 1.65 pbw 1(N-beta-hydroxyethyl-4-piperidyl)-3-(4-piperidyl) propane in a ball mill, and the process described in Example 1 is further applied. The powder displays a pick-up time of 137 seconds and a color value of 22.1. After curing the film 5 minutes at 450°F or 15 minutes at 350°F, a coating results with the following properties:

Good adhesion

-Continued

Flexibility (impact resistance, direct/reverse, 36/84 to 72/42 in./lb.)

Erichsen test 9 mm

Surface hardness pencil of 4H

| Resistance against | ethanol 95% | = 60 days |
| --- | --- | --- |
| | MIBK | = 15 minutes |
| | xylene | = >60 days |
| | HCl 20% | = 30 days |
| | NH$_4$OH 29% | = 30 days |

The coating is transparent and displays a high gloss.

EXAMPLE 6

101.3 pbw of the solid epoxy resin mixture as described in Example 1 are mixed with 5.2 pbw 2,6-xylylene biguanide and 2.0 pbw 1(N-beta-hydroxyethyl-4-piperidyl)-3-(4-piperidyl) propane in a ball mill, and the process described in Example 1 is further applied. The powder displays a pick-up time of 188.3 seconds and a color value of 19.1. After curing the film 5 minutes at 400°F or 15 minutes at 350°F, a coating resulted with the following properties:

Excellent adhesion

Excellent flexibility (impact resistance, direct/reverse, 160 in./lb.)

Erichsen test >9 mm

Surface hardness of 5-6H

| Resistance against | ethanol 95% | = 3-21 days |
| --- | --- | --- |
| | MIBK | = 5 hours |
| | xylene | = >60 days |
| | HCl 20% | = 10 days |
| | NH$_4$OH 29% | = 60 days |

The coating is transparent and displays a high gloss.

EXAMPLE 7

101.3 pbw of the solid epoxy resin mixture as described in Example 1 are mixed with 3.9 pbw dicy and 1.942 pbw 1,3-di(N-beta-hydroxyethyl-4-piperidyl) propane in a ball mill, and the process described in Example 1 is further applied. The powder displays a pick-up time of 55 seconds and color value of 21. After curing the film 5 minutes at 450°F or 30 minutes at 350°F, a coating results with the following properties:

Good adhesion

Flexibility (impact resistance, direct/reverse, 48/52 to 76/72 in./lb.)

Erichsen test >9 mm

Surface hardness pencil of 4-5H

| Resistance against | ethanol 95% | = 30-60 days |
| --- | --- | --- |
| | MIBK | = 15 minutes |
| | xylene | = >60 days |
| | HCl 20% | = 14-30 days |
| | NH$_4$OH 29% | =30-60 days |

The coating is transparent and displays a high gloss.

EXAMPLE 8

101.3 pbw of the solid epoxy resin mixture as described in Example 1 are mixed with 5.2 pbw 2,6-xylylene biguanide and 2.590 pbw 1,3-di(N-beta-hydroxyethyl-4-piperidyl) propane in a ball mill, and the process described in Example 1 is further applied. The powder displays a pick-up time of 157.2 second and a color value of 21.4. After curing the film 5 minutes at 400°F or 15 minutes at 350°F, a coating results with the following properties:

Excellent adhesion

Excellent flexibility (impact resistance, direct/reverse, 160 in./lb.)

Erichsen test >9 mm

Surfact hardness pencil of 6-7H

| Resistance against | ethanol 95% | = 14 days |
| --- | --- | --- |
| | MIBK | = 8 hours |
| | xylene | = >60 days |
| | HCl 20% | = 30 days |
| | NH$_4$OH 29% | = 60 days |

The coating is transparent and displays a high gloss.

EXAMPLE 9

101.3 pbw of the solid epoxy resin mixture as described in Example 1 are mixed with 50 pbw of TiO$_2$ rutile, 5.2 pbw 2,6-xylylene biguanide and 1.62 pbw N-hydroxyethyl-4-propanolpiperidine in a ball mill, and the process described in Example 1 is further applied. The pigmented powder displays a pick-up time of 186 seconds. After curing the film 2 minutes at 450°F, a coating results with the following properties:

Excellent adhesion

Good flexibility (impact resistance, direct/reverse, 140/120 in./lb.)

Erichsen test 9 mm

Surface hardness pencil of 6H

White color (Gardner; ASTM D2244-64T) Rd 82.4; A 1.2; B 3.0

If the coating is cured for 5 minutes at 400°F or 15 minutes at 350°F, it has an impact resistance or over 160 in./lb. The coating has the same resistance against chemicals and solvents as the unpigmented formulation described in Example 4. The coating displays a high gloss, 97% (60°) < geometry.

EXAMPLE 10

100 pbw of a solid polyphenol polyglycidyl ether based on bisphenol-A diglycidyl ether (resin of Example 1A) with an epoxy value/kg of 1.0 and a melting point of 100°C is mixed when melted with 2 pbw of a surface active agent (Modaflow; Monsanto), 0.51 pbw 1,4-bis-(2-hydroxy ethyl) piperdine and 12.95 pbw of a hardener based on [80/20 parts of a trimellitic anhydride combined with an acid polyester (sebacic acid/1,6-hexanediol 1/10 mole ratio) M.P. 62°C] and ground in a ball mill at room temperature.

The total mixture is homogenized by an extruder on a two-roll mill at 120°C and, thereafter, cooled, ground and sieved (<70μ). The technical data for the above powder is:

| Pick-up time at 171°C | 150 seconds |
| --- | --- |
| Shelf life at 40°C | >3 months |

The powder is applied to a clear steel panel with electrostatic spray equipment at a film thickness of 1.5-2.5 mils. After curing the film 15 minutes at 350°F. or 5 minutes at 400°F (oven temperature), a coating results with the following properties:

Excellent adhesion

High flexibility (impact resistance, direct and reverse 160 in/lb.)

Erichsen test (DIN 53156) >9.0 mm

Surface hardness, pencil — 4H

Resistance at room temperature against:

| | |
|---|---|
| ethanol, 95% | 4–7 hours |
| MIBK | 1 hour |
| xylene | >60 days |
| HCl, 20% | 14 days |
| $H_2SO_4$, 50% | 25 days |
| $NH_4OH$, 29% | >60 days |

The coating is transparent and displays a high gloss.

EXAMPLE 11

102 pbw of the solid epoxy resin mixture, as described in EXAMPLE 10, are mixed with 12.95 trimellitic anhydride/polyester (Example 10) and 0.47 pbw N-hydroxy ethyl-4-propanol piperidine in a ball mill, and the process described in Example 10 is further applied. The powder displays a pick-up time of 168 seconds and a shelf life over 3 months. After curing the film 15 minutes at 350°F or 5 minutes at 400°F, a coating results with the following properties:

Excellent adhesion

Good flexibility (impact resistance, direct and reverse >160 in./lb.)

Erichsen test (DIN 53156) >9.0 mm

Surface hardness, pencil — 5H

Resistance at room temperature against solvents and chemicals equals results in Example 10.

EXAMPLE 12

102 pbw of the solid epoxy resin mixture as described in Example 10, are mixed with 12.95 trimellitic anhydride polyester (Example 10) and 0.58 pbw 1-(N-beta-hydroxy ethyl-4-piperidyl)-3-(4-piperidyl) propane in a ball mill, and the process described in Example 10 is further applied. The powder displays a pick-up time of 250 seconds and a shelf life over 3 months. After curing the film 15 minutes at 350°F or 5 minutes at 400°F, a coating results with the following properties:

Excellent adhesion

Good flexibility (impact resistance, direct and reverse 160 in.lb.)

Erichsen test (DIN 53156) >8.5 mm

Surface hardness, pencil — 5 to 6H

Resistance at room temperature against solvents and chemicals equals results in Example 10.

EXAMPLE 13

102 pbw of the solid epoxy resin mixture, as described in Example 10, are mixed with 12.95 trimellitic anhydride/polyester (Example 10) and 0.75 pbw 1,3-di(N-beta-hydroxy ethyl-4-piperidyl) propane in a ball mill, and the process described in Example 10 is further applied. The powder displays a pick-up time of 240 seconds and a shelf life over 3 months. After curing the film 15 minutes at 350°F or 5 minutes at 400°F, a coating results with the following properites:

Excellent adhesion

Good flexibility (impact resistance, direct and reverse >160 in./lb.)

Surface hardness, pencil — 4H

Resistance at room temperature against solvents and chemicals equals results in Example 10.

EXAMPLE 14

98 pbw of the solid epoxy resin, as described in Example 1, are mixed when melted with 1.5 pbw of a surface active agent (Modaflow; Monsanto), 16.6 pbw trimellitic anhydride/polyester (Example 10) as described in Example 10, 2.75 pbw of an adduct hardener based on 2 moles 1-(N-beta-hydroxy ethyl-4-piperidyl)-3-(4-piperidyl) propane and 1 mole epoxy resin above mentioned with an epoxy value/kg of 1.0 and 50.0 pbw of $TiO_2$ rutile in a ball mill, and the process described in Example 10 is further applied. The pigmented powder coating displays a pick-up time at 171°C of 200 seconds and a shelf life over 3 months. After curing the film 10 minutes at 400°F or 5 minutes at 450°F, a coating results with the following properties:

Excellent adhesion

Excellent flexibility (impact resistance, direct and reverse 160 in./lb.)

Surface hardness, pencil — 6 to 7H

Salt spray resistance, 5% NaCl, over 500 hours — no effect

Erichsen test (DIN 53156) 7–8 mm

Resistance at room temperature against:
| | |
|---|---|
| ethanol | 6 days |
| MIBK | 4 hours |
| xylene | >30 days |

Gloss, 60° – 85

Whiteness (ASTM, D2244-64T)

| | |
|---|---|
| Rd | 84.2 |
| A | −1.5 |
| B | 4.7 |

The coating displays good flow.

EXAMPLE 15

100 pbw of a liquid polyphenol polyglycidyl ether based on bisphenol-A diglycidyl ether with an epoxy value/kg of 5.2–5.5 and a viscosity at 25°C of 12,000–15,000 cps is mixed with 87 pbw methyltetrahydrophthalic anhydride, as well as 3 pbw 1-(N-beta hydroxy ethyl-4-piperidyl)-3-(4-piperidyl) propane. This accelerator is dissolved in the methyl tetrahydrophthalic anhydride by stirring at 100°C. This casting formulation displays a pot life of over 24 hours at 77°F, a gel pick-up time of 116–167 seconds at 150°C (>400 seconds without accelerator). The Barcol hardness of a cured casting after 30 minutes at 300°F is at 265°=

40, at 200°F = 74 or at 77°F = 83. The casting is transparent and has a smooth surface.

I claim:

1. A homogeneous pulverulent coating composition having an average particle size of 20 to 350 microns, comprising a solid 1,2 epoxy resin having more than one epoxy group, a hardener selected from the group consisting of dicyandiamide, 2,6-xylylene biguanide, methyltetrahydrophthalic anhydride and trimellitic anhydride; and an accelerator selected from the group consisting of a compound of the formula

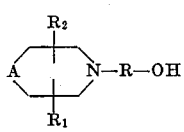

wherein A is —$CH_2$—, —$NR_5$— wherein $R_5$ is hydrogen, lower alkyl or hydroxyloweralkyl, R is lower alkylene, $R_1$ is hydrogen, $C_{1-20}$ alkyl, phenyl, hydroxy, halo, halophenyl, $C_{1-20}$ hydroxyalkyl or $C_{2-20}$ alkenyl; and $R_2$ is hydrogen or a group of the formula

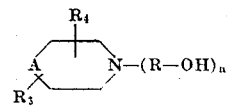

wherein $R_3$ is a direct bond or $C_{1-6}$ lower alkylene $R_4$ is lower alkyl, and n or $(R-OH)_n$ is hydrogen, and wherein the ratio of hardener to epoxy resin is from about 0,80 to about 1.1 equivalents per epoxy equivalent; and from about 5 to 40 parts of N-hydroxyalkylpiperidine per 100 parts of hardener.

2. A composition of claim 1 wherein the accelerator is selected from the group consisting of N-hydroxyethylpiperidine, N-hydroxypropylpiperidine, N-hydroxyisopropylpiperidine, 2-methyl-N-hydroxymethylpiperidine, 2-phenyl-N-hydroxymethylpiperidine, 2-hydroxy-N-hydroxymethylpiperidine, 2-chloro-N-hydroxymethylpiperidine, 2-p-chlorophenyl-N-hydroxymethylpiperidine, 2-hydroxymethyl-N-hydroxymethylpiperidine, 2-alkyl-N-hydroxymethylpiperidine, 1,3-di (N-beta hydroxyethyl)-4-piperidyl propane and 1-N-beta hydroxy-4-piperidyl-3-(4-piperidyl) propane.

3. The composition of claim 1 wherein the epoxy resin is prepared from a dihydric phenol and epihalohydrin.

* * * * *